Nov. 10, 1970   B. FUTTERER   3,539,854

COMMUTATOR FOR A MINIATURE MOTOR

Filed Sept. 16, 1968

United States Patent Office
3,539,854
Patented Nov. 10, 1970

3,539,854
COMMUTATOR FOR A MINIATURE MOTOR
Bodo Futterer, Lucerne, Switzerland, assignor to Interelectric, Sachseln OW, Switzerland, a company of Switzerland
Filed Sept. 16, 1968, Ser. No. 760,008
Claims priority, application Switzerland, Sept. 15, 1967, 13,055/67
Int. Cl. H02k 13/04
U.S. Cl. 310—233    6 Claims

ABSTRACT OF THE DISCLOSURE

A commutator for a motor in which the wire segment parts have a pre-tension toward the commutator axis in the region of the insulating core, and the method of making such a commutator by plastic molding.

BACKGROUND AND OBJECTS

The invention concerns a commutator for a miniature motor, and a method of producing it.

Commutators for miniature motors have to have as small as possible a diameter in order to keep the braking retardation exerted on the commutator by the brushes, and hence the reduction of the motor efficiency, to a minimum.

The adaptation of construction methods from commutators of standard size to commutators for miniature motors presents a number of difficulties. It has already been proposed to form a drum commutator for a miniature motor such that the commutator segments are formed from shaped wire conductors held in an insulating material, the ends of the wires being exposed and projecting axially parallel from the insulating material, the conductors within the insulating material being bent radially outwards from the axis, with their ends remote from the axis also projecting freely from the insulating material for connecting purposes. This commutator permits easy attachment of the wires of the armature winding, and is suitable for a large number of segments, however, it has the disadvantage that it is an expensive design to produce. For example, to turn the commutator rotor surface it is often necessary to use a diamond cutter to produce a good surface.

The object of the invention is to provide a drum commutator for miniature motors which has a high surface finish and is mechanically rigid. Another object of the invention is a method of producing such a drum commutator which is simpler than known methods.

SUMMARY OF THE INVENTION

The invention is based on a drum commutator for miniature motors having a number of angular segments arranged around a core of insulating material, the connecting ends of which are turned away from the commutator axis and at least over a part of their length are retained in insulating material.

The drum commutator according to the invention is distinguished by the fact that the segment parts have a pre-tension towards the commutator axis in the region of the insulating material core.

It has been found that the difficulties encountered hitherto in constructing drum commutators for miniature motors of the kind referred to originated from the fact that the segments were not always firmly connected in the commutator region with the core of insulating material, so that the segments, when the surface of the commutator was machined in a lathe, were capable of slight movement, thus preventing the production of a smooth rotor surface. A commutator in accordance with the present invention has a smooth truly cylindrical surface which is obtained by a fraction of the operations which were required in hitherto known production processes.

The commutator regions of the segment parts are preferably additionally firmly connected with the insulating material. This not only retains the commutator parts firmly in a radial direction but also in a peripheral direction, so that the rotor surface of the commutator may be readily machined.

In connection with a bell-shaped armature the commutator of the invention is formed such that the connecting ends of the segments are at least partially embedded in the end disc of the bell-shaped armature. Thus the end disc may have a number of apertures close to its circumference corresponding to the number of segments. This provides a simple form of commutator.

A further simplification consists in making the commutator segments from profiled (non-circular) wire.

Preferably the core of insulating material and the end disc are formed integrally, so as to enable them to be produced in one operation.

The method of producing the commutator in accordance with the invention consists in that the segments are inserted in a hollow mold which encloses at least the ends thereof, the radially projecting connecting shanks of the segments are so retained that the commutator segments project radially inwards from the hollow mold, and that the hollow mold is filled with plastics material injected at such pressure that the commutator parts are urged against the wall surface of the hollow mold, the pressure being maintained until the plastics material has set. This production method provides absolute reliability in that the commutator parts receive a pre-tension which remains in the completed commutator. It has been found that commutators produced in this manner are substantially more rigid than commutators which are made in a conventional manner without using pre-tension, with a core of plastics material.

In accordance with a modified method the procedure is such that the segments are inserted in a hollow mold which encloses at least the ends thereof, that the hollow mold is filled with plastics material, that the plastics material is allowed to set first in the region of the end parts, that the radially projecting connecting shanks of the segments are then pre-tensioned, and that the remaining part of the plastics material is allowed to set.

In this modified method it is also convenient for the plastics material to be kept under pressure during setting. The setting itself can be carried out in known manner by supplying heat if the insulation is thermo-setting.

To produce commutators in accordance with the invention, segments made of profiled wire and having a trapezoidal cross-section are particularly suitable. By this means the surface of the commutator has to have a minimum of machining, and the gaps between the segments have a constant width over the whole length of the commutator.

The segments are preferably inserted in a hollow mold having separating ribs facing radially inwards. The advantage of this is that the plastics material of the core of insulating material no longer reaches to the rotor surface of the completed commutator and that, during production no pressure compensation occurs between the radially inside region of the hollow mold and the radially outwardly disposed supporting surfaces for the commutator ends.

BRIEF DESCRIPTION OF THE DRAWINGS

The invention is described hereinafter with reference to the accompanying drawings.

DETAILED DESCRIPTION OF THE INVENTION

Figure 1:
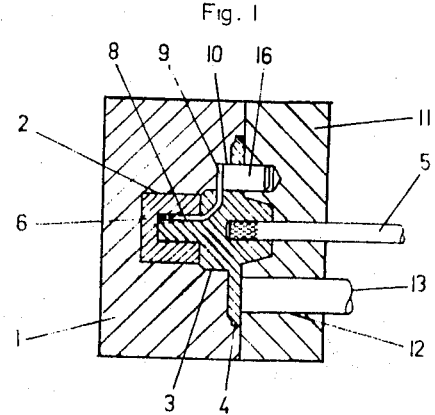
FIG. 1 shows a device for carrying out the method of the invention.
Figure 2:
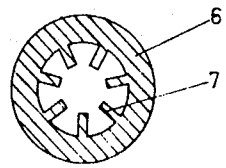
FIG. 2 is a cross-section through a hollow mold in which the commutator ends of the segments are inserted.

FIG. 1, includes a mold portion 1, which has three concentric, cylindrical hollow regions 2, 3 and 4. The smaller hollow region 2 serves to receive a hollow mold 6, a cross-sectional view of which is shown in FIG. 2, whilst the central hollow region 3 and large hollow region 4 are initially empty and are later filled by injection with plastics material. The hollow mold 6 has ribs 7 facing radially inwards. The segments are made of rectangularly bent wire members of trapezoidal cross-section and each have a commutator end 8 and a connecting tag 9. The commutator parts are inserted with their ends 8 in the hollow mold 6, such that they are held by the ribs 7. When the hollow mold has been filled in this manner with segments, it is inserted in the smallest hollow region 2 of the device, the connecting tags 9 being supported against recesses 10 formed in the central hollow region, the supporting surface of the recesses being adapted to the outline of the segments. The device also includes a closure cover 11 which is provided with a bore for a shaft 5 and with an opening 12 which leads into the open space between the parts 1 and 11 and to which a conduit 13 is connected, serving to supply the plastics material into the cavity. The closure cover is provided with pins 16 aligned with the recesses 10, which align the part 1 with the cover 11.

As shown in broken lines in FIG. 1, the commutator ends 8 in the assembled state project radially inwards from the hollow mold 6. As soon as plastics material is injected under pressure the commutator parts are again forced against the wall surface of the hollow mold 6 and are thus pre-tensioned. Since the pressure is maintained until the plastics material injected into the mold has set, the commutator parts of the completed commutator have a pre-tension directed radially inwards.

Figure 3:
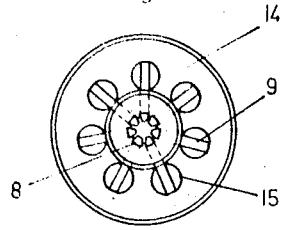
FIG. 3 is a plan view of a completed commutator in accordance with the invention which is made integrally with an end disc.

FIG. 3 is a plan view of a completed commutator in accordance with the invention with an end disc 14 of an insulating material, in the base of which the connecting tags 9 of the commutator, which extend radially outwards, are partially embedded. The circumferential surface of the end disc 14 serves to secure it to a cylindrical armature winding. In the end disc 14 apertures 15 aligned with the connecting tags 9 are provided which facilitate holding the connecting tags 9 in place during production of the commutator. The segments are made of rectangularly bent wire members of trapezoidal cross-section and each have a commutator end 8 and a connecting tag 9.

Figure 4:
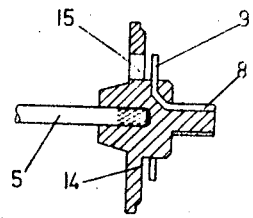
FIG. 4 shows a longitudinal section through the completed commutator.

FIG. 4 shows a longitudinal section through the completed commutator. It may be seen that the end disc 14 is molded on one end of shaft 5, which serves for supporting the rotor structure.

Since the commutator ends 8 are biased with respect to the connecting tags 9 towards the axis of the commutator, the commutator ends 8 adhere intimately to the surrounding material of the end disc 14, thus, preventing any vibrational movement of the commutator ends during machining of the commutator surface.

I claim:

1. A commutator for a motor comprising: a plurality of angular segments arranged around a core of insulating material, each of said segments having a connecting tag projecting outwardly from the commutator axis and being held at least over a region of its length in said insulating material, said segments also having commutator ends pre-tensioned towards said commutator axis in the region of said core of insulating material.

2. A commutator according to claim 1, wherein the commutator ends of the segments are additionally firmly connected to the core of insulating material.

3. A commutator according to claim 1, for use in connection with a bell-shaped armature, wherein the connecting tags of the segments are at least partially embedded in an end disc of the armature.

4. A commutator according to claim 3, wherein the end disc has a number of apertures close to its circumference corresponding to the number of commutator segments through which apertures the connecting tags of the segments extend.

5. A commutator according to claim 1 wherein the commutator segments are made of wire of non-circular section.

6. A commutator according to claim 3 wherein the core of insulating material and the end disc are formed as an integral whole.

References Cited

UNITED STATES PATENTS

| 1,464,184 | 3/1921 | Mansbendel | 310—235 |
| 2,999,956 | 9/1961 | Faulhaber | 310—235 |

WARREN E. RAY, Primary Examiner

L. L. SMITH, Assistant Examiner

U.S. Cl. X.R.

29—597